(12) United States Patent
Day et al.

(10) Patent No.: US 7,299,371 B2
(45) Date of Patent: *Nov. 20, 2007

(54) HIERARCHICAL MANAGEMENT FOR MULTIPROCESSOR SYSTEM

(75) Inventors: Micahel Norman Day, Round Rock, TX (US); Harm Peter Hofstee, Austin, TX (US); Charles Ray Johns, Austin, TX (US); James Allan Kahle, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 376 days.

This patent is subject to a terminal disclaimer.

(21) Appl. No.: 10/912,479

(22) Filed: Aug. 5, 2004

(65) Prior Publication Data

US 2006/0031835 A1   Feb. 9, 2006

(51) Int. Cl.
*G06F 1/28* (2006.01)
(52) U.S. Cl. .................................. 713/323; 713/310
(58) Field of Classification Search ................ 713/323, 713/310
See application file for complete search history.

(56) References Cited

U.S. PATENT DOCUMENTS

| | | | | |
|---|---|---|---|---|
| 5,396,635 A * | 3/1995 | Fung | ........................... | 713/323 |
| 5,638,541 A * | 6/1997 | Sadashivaiah | ............... | 713/323 |
| 5,996,083 A * | 11/1999 | Gupta et al. | ................. | 713/322 |
| 6,230,273 B1 * | 5/2001 | Rieker | ........................ | 713/300 |
| 7,055,046 B2 * | 5/2006 | Malueg et al. | ............... | 713/320 |
| 2006/0031836 A1 | 2/2006 | Brown et al. | | |

* cited by examiner

*Primary Examiner*—Thuan Du
(74) *Attorney, Agent, or Firm*—Francis Lammes; Stephen J. Walder, Jr.; D'Ann N. Rifai

(57) ABSTRACT

The present invention provides for controlling the power consumption of an element. A first power control command is issued by software for the element. It is determined if the power control command corresponds to an allowable power control state for that element as defined by the hardware. If the power control command is not an allowable power control state for that element, the hardware sets the power control at a higher level than the power control state issued by the software. A hierarchy of power consumption is defined for different elements of a chip by software, which provides the minimum level of power consumption by any element or sub-element on a chip.

22 Claims, 3 Drawing Sheets

HIERARCHICAL MANAGEMENT FOR MULTIPROCESSOR SYSTEM

CROSS-REFERENCED APPLICATION

This application relates to co-pending U.S. patent application Ser. No. 10/912,481 entitled "Hierarchical Management for Multiprocessor System With Real-Time Attributes", filed concurrently herewith.

TECHNICAL FIELD

The present invention relates generally to power consumption and, more particularly, to the individualized control of power consumption by processors and subsystems in a multiprocessor system.

BACKGROUND

In conventional technologies, there are ways of controlling power dissipation by a processing chip. For instance, states are introduced, such as on full, on slower, clock off and chip off. Examples are the "nap, doze, sleep and suspend" states in implementations of the PowerPC architecture, and the "sleep" and "deeper sleep" states in enhanced Intel SpeedStep® power management for processors.

However, there are a number of problems with the conventional technologies when applied to multiprocessor systems. First, in prior systems, power management modes are not software accessible. In typical implementations the system controller is responsible for using the power management capabilities of the chip to effect power management. This is disadvantageous because though the system controller can respond to such system aspects as chip or module temperature, a system controller has limited information about the tasks the processors perform. In some microprocessors that perform emulation this problem has been partially overcome by providing a power management interface to the hardware emulation layer. This has been done in processors by Transmeta® corporation. Because the emulation layer can observe a level of software activity, power management can be done in response to both external measures such as chip temperature and software activity as monitored by the emulation software. This enables such processors to save additional power when only light tasks, such as DVD playback, are performed.

However, because the power management states are not available to the operating system or a hypervisor, additional opportunities for power management, such as managing power by scheduling tasks and levels of activity of multiple tasks is not performed. This capability is especially important in multiprocessor systems where an operating system or hypervisor has the freedom to rebalance tasks (threads) across multiple processors in order to improve overall power or power and heat distribution throughout the chip or system. In symmetric multiprocessor systems, even greater opportunities for task placement or migration and hence power balancing exist.

Furthermore, conventional technologies, have not successfully implemented a control system that is individually directed to individual processors of a multiprocessor system. Although "system wide" implementations have been created that allow for external control of the entire system with the microprocessing chips in lock-step, there is no control shown for individual processors in a multi-processor system.

Furthermore, system-on-chip designs that combine the processor with such units as memory controllers and bus controllers require extending power management techniques beyond the processors themselves. Also, modern microprocessors may allow for more detailed power management of units within a single processor core. Hence a more hierarchical approach, where power management states can apply to collections of units, including processors, and subunits of processors, is desirable.

Therefore, there is a need for an architected power control interface that can be used by a hypervisor or operating system in a multiprocessing environment that addresses at least some of the concerns associated with conventional power management control in multiprocessor and system-on-chip environments.

SUMMARY OF THE INVENTION

The present invention provides for controlling the power consumption of an element in a multiprocessor or system-on chip environment. A first power control command is issued by software for the element. It is determined if the power control command corresponds to an allowable power control state for that element as defined by the hardware. If the power control command is not an allowable power control state for that element, the hardware sets the power control at a higher level than the power control state issued by the software.

BRIEF DESCRIPTION OF THE DRAWINGS

For a more complete understanding of the present invention, and the advantages thereof, reference is now made to the following Detailed Description taken in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electro-magnetic signaling techniques, and the like, have been omitted inasmuch as such details are not considered necessary to obtain a complete understanding of the present invention, and are considered to be within the understanding of persons of ordinary skill in the relevant art.

In the remainder of this description, a processing unit (PU) may be a sole processor of computations in a device. In such a situation, the PU is typically referred to as an MPU (main processing unit). The processing unit may also be one of many processing units that share the computational load according to some methodology or algorithm developed for a given computational device. For the remainder of this description, all references to processors shall use the term MPU whether the MPU is the sole computational element in the device or whether the MPU is sharing the computational load with other MPUs, unless otherwise indicated.

It is further noted that, unless indicated otherwise, all functions described herein may be performed in either hardware or software, or some combination thereof. In a preferred embodiment, however, the functions are performed by a processor, such as a computer or an electronic data processor, in accordance with code, such as computer program code, software, and/or integrated circuits that are coded to perform such functions, unless indicated otherwise.

Figure 1:
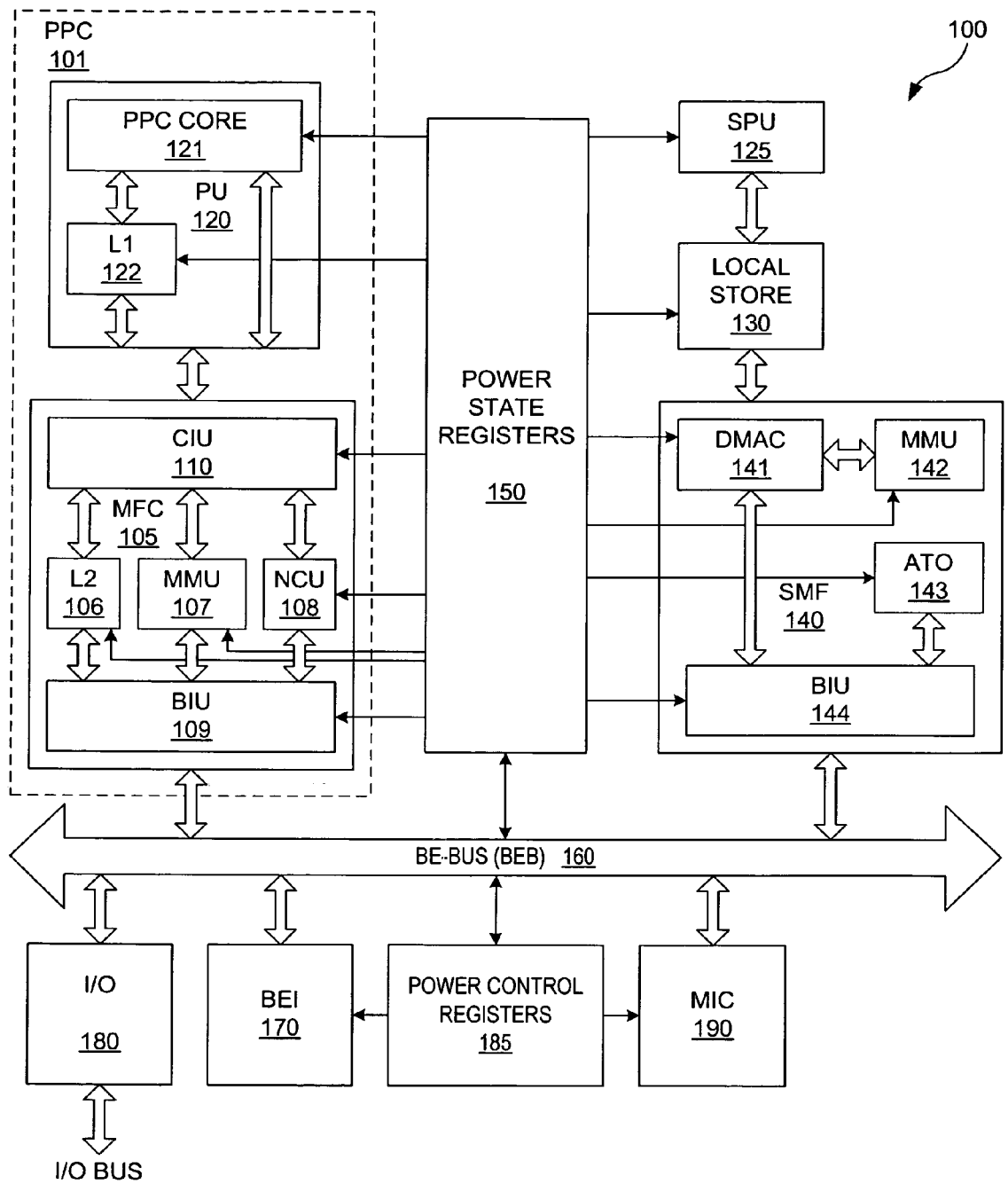
FIG. 1 schematically depicts a multiprocessing environment in which power control occurs.

Turning to FIG. 1, disclosed is an environment 100 in which power control of individual elements in a multiprocessor can operate. There is a memory flow controller (MFC) 105 coupled to a processor unit (PU) 120, an SPU 125 coupled to a local store 130, and a SMF 140. The MFC 105 and the PU 120 comprise a PPC 101.

Typically, each element has its own sub-elements, and every sub-element has its own indicia of an associated power state in a power state register 150. If there is not a sub-element, the element, such as SPU 125, has its own power state with-n the power state register 150. Within the power state register 150, software values exist for ensuring that the given element runs, at a minimum power level necessary to support the system function requested by software.

For instance, the MFC 105 has a L2 cache 106, a memory management unit (MMU) 107, a non-cacheable unit (NCU) 108 a bus interface unit (BIU) 109, and a microprocessor interface unit (CIU) 110. The PU 120 has a PPC core 121 and a L1 cache 122, also coupled to its own power state register 150. The SPU 125 and the local store 130 are also coupled to the power state register 150. Each of these elements or sub-elements is coupled to the power state register 150.

Likewise, the SMF 140 has a direct memory access controller (DMAC) 141, a memory management unit (MMU) 142, an atomic memory unit (ATO) 143 and a bus interface unit (BIU) 144. Each of these elements 141-144 are also coupled to the power state registers 150. The MFC 105, and the SMF 140 are coupled to a broad-band engine bus 160. The BEB 160 is also coupled to a I/O bus 180, a broad-band interface (BEI) 170, and a memory interface controller (MIC) 190. The activity or power consumption levels of both of these are controlled by a power control register 185, which is programmed by the power state register 150.

The sub-elements of 105, 120, 140, and so on, read the values in the registers 150 and determine whether to be in a fully active state, a slowed state, a paused state, a state retained and isolated state, or a state lost and isolated state, or another power consumption state, as a function of a value written by software. Each of these individual software-specified states correspond to increasing or decreasing power consumption for individual units 106-110, and so on.

However, the power state that is specified and stored within each register 150 for use with each element, sub-element, or unit within the system 100, in some implementations, could potentially be not specifically be implemented for the requested hardware state in other words, only a subset of power states are implemented. For instance, the "paused" state for the L2 cache 106 could be undefined, although this is the power state that was requested by the software but not directly implemented. Therefore, each element, such as the L2 cache 106, L1 cache 121, the local store 130, and so on, therefore will configure itself to operate at the next higher power state implemented for that element in order to support the functionality and responsiveness requested by software.

Therefore, the element is operating at the power level requested by the software or at the next higher power level implemented, thereby ensuring the software required functionality is available. Each sub-element 106-110, 121-122, element 125, 130 and so on, is therefore programmed by the software to perform at a minimum power level necessary to support the system function. However, if the element can or does not support that level of power state, the next higher level of activity (such as paused requested versus slowed—implemented), is then chosen. However, the software is dependent on the established power hierarchy that the element will operate at the capability level specified by the requested power level or if that level is not available, at the next greater functional capability that is available. That way, the functional characteristics of an individual element is at minimum what has been requested by the software.

Figure 2A:
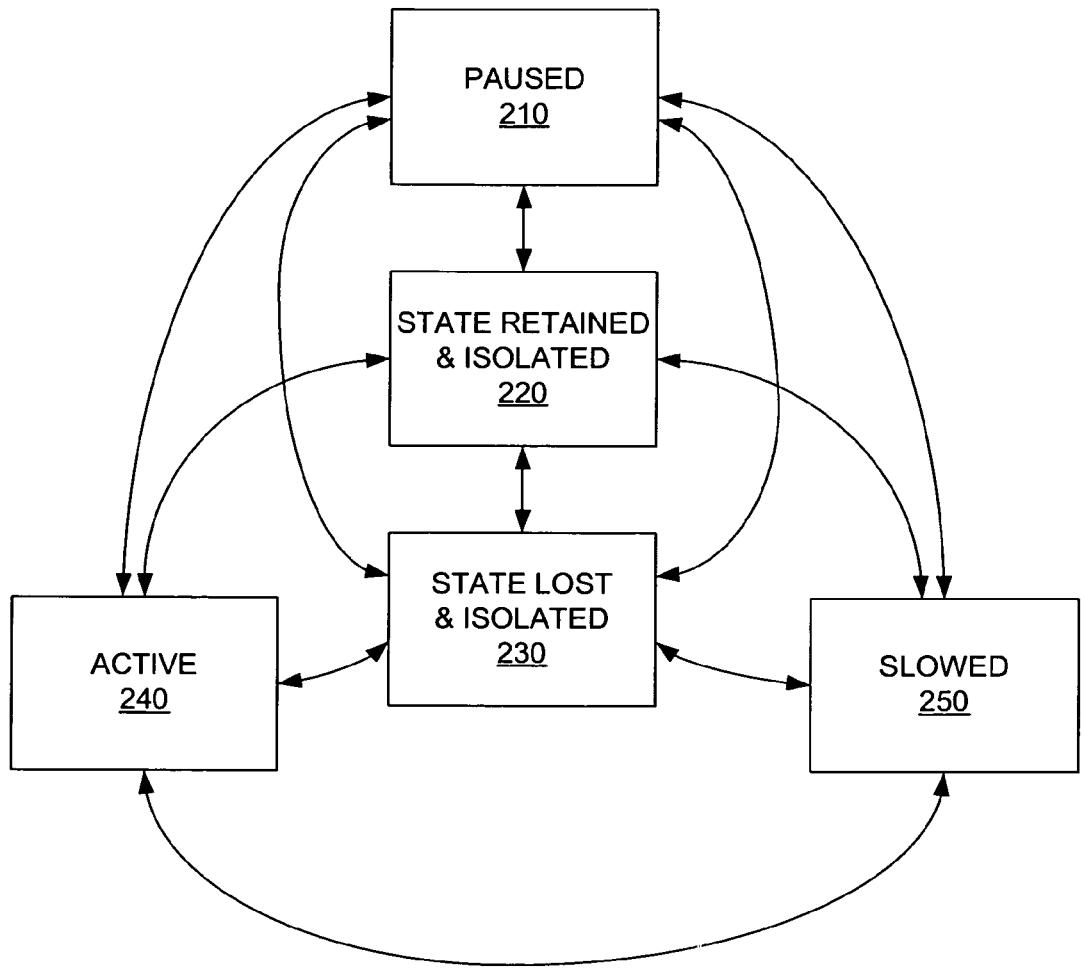
FIG. 2A schematically depicts the transitions of the power states for individual element control.

Turning now to FIG. 2A, disclosed is a state transition map of system 100 (FIG. 1) of activity states for the various units. Each sub-element 106-110 has within its own register 150 a value written by software that denotes the minimum activity level requested of that element, sub-element, or unit. The highest activity/highest power state is an active 240 state. In this state, the performance of the processor or other sub-element is not limited by power management. In the active state 240, the element, sub-element, or unit consumes the maximum amount of power or is otherwise in the most active state. From the active state 240, the element, sub-element, or unit can transition (by software request) to any other states in FIG. 2A that have been implemented.

The next lower activity state in FIG. 2A is the slowed state 250. In the slowed state 250, performance is reduced to reduce power consumption. Other than the fact that the processing speed as a function of received cycles is reduced, the element, sub-element, or unit functions similar to the active state.

The next lowest activity state is the paused state 210. In the paused state, the element, sub-element, or unit is not guaranteed to make forward progress in providing its function. However, the currently processed information state is maintained. The unit also remains responsive to other unit requests to retrieve or update data in its current state. This state is typically transitioned back to slowed or active, by a request from another unit.

The next lowest state is the state retained and isolated state 220. In the state retained and isolated state 220, access to the element, sub-element, or unit is prohibited from any other unit. However, information internally stored in the element, sub-element, or unit is retained. There is no forward functional progress made during the state retained and isolated state 220 and internal data can not be accessed or updated by other units.

Finally, there is the state lost and isolated state 230. In the state lost and isolated state 230, the element, sub-element, or unit is logically removed from a multiprocessor system. In other words, the element, sub-element, or unit does not retain any internal information as to its state, and the element, sub-element, or unit is not accessible other units and therefore by the operating system, the hypervisor, or application. In the state lost and isolated 230, the element, sub-element, or unit is at the lowest level of activity and therefore power consumption. Generally, there can be a correlation between a lower activity level and a lower level of power consumption by a given element, unit or subunit.

In FIG. 2A, the states 210 through 250 are applied to each element 106-110, and other elements or sub-elements of the system 100, individually under software direction, and supported by hardware action. This gives a much greater flexibility to the control of individual processors or sub-elements. Furthermore, at least because of the hardware override of the individual component software settings when the software-selected power level is undefined, this helps to ensure that the processing of any data or executions of any instructions are performed at least to the level of function selected by the hypervisor, operating system, application, or so on.

Figure 2B:
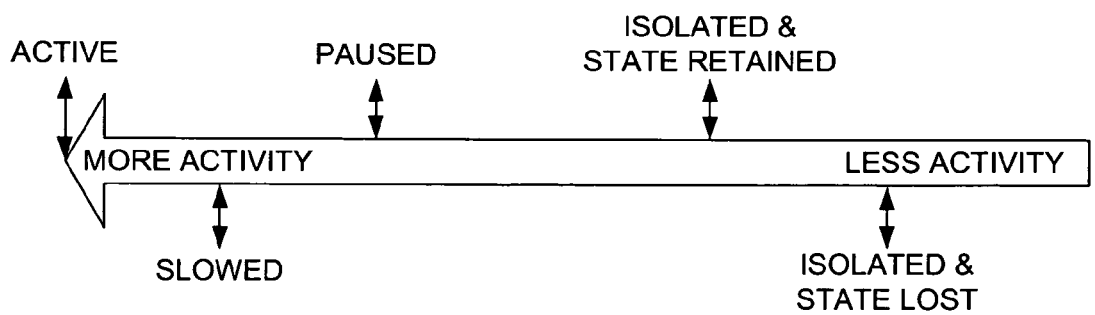
FIG. 2B schematically depicts the relationship between power consumption and the various states of the controlled elements.

Turning now to FIG. 2B, illustrated is a power arrow illustrating relative power consumption, starting from the highest, "active" state, to the "isolated and state lost" state. These states may or may not be defined for any individual element. If the state is not defined for an element that is selected by the software, then the power state for that element is advanced to the next highest available power state by the hardware. In other words, in FIG. 2B, the power states, as registered in the power state registers 150 and the power control registers 180, are implemented by each element, sub-element, or unit at least to the level of function commanded by the software, or the next higher implemented available power state depicted by moving left on the power hierarchy diagram of FIG. 2B.

One aspect of accepting the specified software power management states, and then support setting the next higher implemented power state when the software requested state is not available is that it allows the software to be used with differing hardware power implementations. For instance, one version of hardware might not support a given level of activity of a unit, but another version of the hardware does support the level of activity for the unit. However, these different levels of enablement as proposed in the above hierarchy will allow for the same software to hierarchically use distinct usage enablements for elements of hardware.

Figure 3:
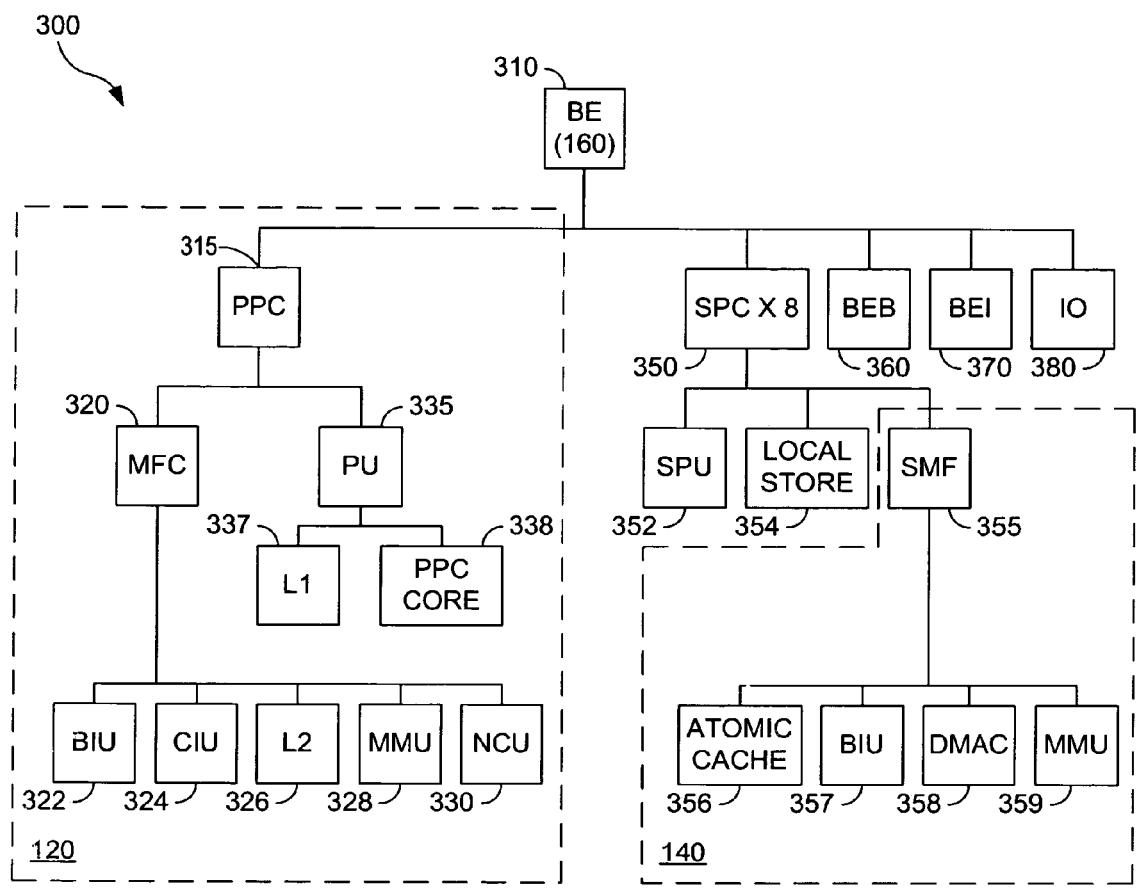
FIG. 3 schematically illustrates a power hierarchy for the multiprocessing environment associated with FIG. 1.

Turning now to FIG. 3, illustrated is an exemplary power hierarchy 300 for managing the system 100. At the highest level is a Broadband Engine ("BE") 310, corresponding to the BE 160 of FIG. 1. The BE 310 sets the highest physical power requirements of a system. In other words, no unit below the BE in the hierarchy will have a higher hardware power state than the BE, unless required to do so due to the specified power state being undefined for a particular unit, element or sub-element. For instance, if the BE 310 is in a "sleep" state, the power PC (PPC) 315, which corresponds to the PPC 101, the synergistic processor (SPC) 350, which corresponds to the SMF 140, the BE bus (BEB) 360, the bus interface logic (BEI) 370, and the input output port (IO) 380 will all have, as their physical power states, a power state that is no higher than the element from which that element depends. This is the default condition. For instance, the BEI 370 will be no higher (no more active) than the EE 310. These elements and sub-elements can correspond to I/O 180, the BEI 170, the SPU 125, respectively.

However, in FIG. 3, a physical element can be set by software for a lower power consumption state than the element above it. For instance, both a memory flow controller (MFC) 320 and a processor unit (PU) 335 would share the same physical power state as the PPC 315 in a default position. In one illustrative example, a bus interface unit (BIU) 322 and the L2 cache 326 could be set at a lower state, such as isolated and state retained. However, a cache interface unit (CIU) 324, and a non-cacheable unit (NCU) 330 could be set at the same power consumption state as the MFC 320.

Alternatively, if the BE 310 is set at the active state by the software, this power consumption state would ordinarily be inherited by a SPU 352, a Local Store 354, and a SMF 355. However, an atomic cache 356, a bus interface unit (BIU) 357, direct memory access controller (DMAC) 358, and the memory management unit (MMU) 359 could be set at a lower state, such as paused, isolated and state retained, or isolated and state lost.

In other words, in the system 100, software control (that is, the "architected state" of the system), is used to control the power system. The software control is used to set different power consumption levels to different states of the hierarchy. For instance, software could be used to set the BE at the highest "active" level of power consumption, the PPC at the second "paused" level of power consumption, and the L2 cache at the third "paused" level of power consumption.

However, a given unit in the hierarchy may not support a power level selected by the software. For instance, if a L1 cache 337 or a PPC core 338 is set at an "isolated and state retained" power state, the hardware of a particular implementation of the system 100 may not support this particular power state for this particular element, as the power states supported can be implementation specific. Therefore, the hardware of the system 100 takes the selected element, such as the L1 cache, and places it in the next highest defined energy consumption state. In an exemplary, this would be either the "paused" state, the "slowed" state, or the "active" state, in that order, depending upon whether or not these other states are defined.

In other words, in the system 100, the software is not to assume a level of activity for any unit that is higher than what the architectural state guarantees, and the hardware delivers at least the level of activity the architecture specifies. In other words, the software designates a certain power consumption state for a specific element, such as the BIU 322, the SMF 355, a DMAC 358, and so on. In the absence of contrary software instructions, each element beneath another element in the hierarchy shares the same power status as the element immediately above it in the hierarchy.

However, if a level of activity state is defined for an element, perhaps the MMU 328, that is not supported by the physical layout of the system 100, the hardware sets the MMU at the next highest power consumption level. However, the software itself runs on the assumption that the physical device, such as the MMU 328, does not perform power consumption, in other words, is not faster, than the power consumption specified by the software. By so doing this, the software ensures that the various components of the hierarchy function at a minimum level, which can be relied upon by other components of the software and hardware.

It is understood that the present invention can take many forms and embodiments. Accordingly, several variations may be made in the foregoing without departing from the spirit or the scope of the invention. The capabilities outlined herein allow for the possibility of a variety of programming models. This disclosure should not be read as preferring any particular programming model, but is instead directed to the underlying mechanisms on which these programming models can be built.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modi- fications may be considered desirable by those skilled in the art based upon a review of the foregoing description of preferred embodiments. Accordingly, it is appropriate that the appended claims be construed broadly and in a manner consistent with the scope of the invention.

The invention claimed is:

1. A method of controlling an activity level of an element in a multiple processing unit processor, composing:
   issuing, by software, an activity control command for the element of the multiple processing unit processor, wherein the multiple processing unit processor includes a plurality of processing units that include at least one processing unit (PU) and at least one synergistic processing unit (SPU);
   determining if the activity level in the activity control command corresponds to an allowable activity control state for the element as defined by hardware;
   responsive to the activity control command corresponding to the allowable activity control state for the element, setting the activity level for the element to the activity level defined by the activity control command; and
   responsive to the activity level in the activity control command failing to correspond to the allowable activity control state for the element, setting the activity level at a higher activity level than the activity level defined by the activity control command.

2. The method of claim 1, wherein the step of setting the activity level at the higher activity level than the activity level defined by the activity control command is performed by hardware.

3. The method of claim 1, wherein the act of issuing the activity control command further comprises setting the activity level.

4. The method of claim 1, wherein setting the activity level at the higher activity level than the activity level defined by the activity control command further comprises setting the activity level at a next allowable higher activity level.

5. The method of claim 1, further comprising defining the element within an activity hierarchy.

6. The method of claim 5, further comprising selecting the activity control state for the element within the activity hierarchy.

7. The method of claim 6, further comprising inheriting the activity control state from a first element in the activity hierarchy to a second element of the activity hierarchy.

8. The method of claim 1, further comprising issuing the activity control command of the element of a multiprocessor system to individually control each element of the multiprocessor system.

9. The method of claim 1, wherein the activity control command comprises at least one of an active state activity control command, a slow state activity control command, a paused state activity control command, a state retained and isolated activity control command, or a state lost and isolated activity control command.

10. The method of claim 1, wherein the at least one SPU comprises a plurality of SPUs and wherein the PU and the plurality of SPUs are on a same processor chip.

11. The method of claim 10, wherein the plurality of SPUs comprises between two to eight SPUs, inclusively.

12. A system, comprising:
   a first element in a multiple processing unit processor;
   a register, coupled to the first element, wherein the register is configured to receive, by software, an activity control command for the first element of the multiple processing unit processor, wherein the multiple processing unit processor includes a plurality of processing units that include at least one processing unit (PU) and at least one synergistic processing unit (SPU); and
   a memory coupled to the plurality of processing units, wherein the memory includes a set of instructions and wherein the plurality of processing units execute the set of instructions to:
      determine if the activity level in the activity control command corresponds to an allowable activity control state for the first element as defined by hardware;
      set the activity level for the first element to the activity level defined by the activity control command in response to the activity control command corresponding to the allowable activity control state for the first element; and
      set the activity level at a higher activity level than the activity level defined by the activity control command in response to the activity level in the activity control command failing to correspond to the allowable activity control state for the first element.

13. The system of claim 12, wherein the first element comprises a memory flow controller.

14. The system of claim 12, wherein the first element comprises a local store.

15. The system of claim 12, wherein the first element is hierarchically associated with a second element.

16. The system of claim 15, wherein the second element inherits the activity level of the first element.

17. The system of claim 15, wherein the second element is set at a lower activity level than the activity level by the software.

18. The system of claim 12, wherein the at least one SPU comprises a plurality of SPUs and wherein the PU and the plurality of SPUs are on a same processor chip.

19. A computer program product for controlling an activity level of an element in a multiple processing unit processor, the computer program product having a computer readable storage medium with a computer program embodied thereon, the computer program comprising:
   computer code for issuing, by software, an activity control command for the element of the multiple processing unit processor, wherein the multiple processing unit processor includes a plurality of processors units that include at least one processing unit (PU) and at least one synergistic processing unit (SPU);
   computer code for determining if the activity level in the activity control command corresponds to an allowable activity control state for the element as defined by hardware;
   responsive to the activity control command corresponding to the allowable activity control states for the element, computer code for setting the activity level for the element to the activity level defined by the activity control command; and
   responsive to the activity level in the activity control command failing to correspond to the allowable activity control state for the element, computer code for setting the activity level at a higher activity level than the activity level defined by the activity control command.

20. The computer program product of claim 19, wherein the at least one SPU comprises a plurality of SPUs and wherein the PU and the plurality of SPUs are on a same processor chip.

21. A multiple processing unit processor for controlling an activity level of an element, the multiple processing unit processor including a computer program on a computer readable storage medium, the computer program comprising:

computer code for issuing, by software, an activity control command for the element of the multiple processing unit processor, wherein the multiple processing unit processor includes a plurality of processing units that include at least one processing unit (PU) and at least one synergistic processing unit (SPU);

computer code for determining if the activity level in the activity control command corresponds to an allowable activity control state for the element as defined by hardware;

responsive to the activity control command corresponding to the allowable activity control states for the element, computer code for setting the activity level for the element to the activity level defined by the activity control command; and responsive to the activity level in the activity control command failing to correspond to the allowable activity control state for the element, computer code for setting the activity level at a higher activity level than the activity level defined by the activity control command.

22. The multiple processing unit processor of claim 21, wherein the at least one SPU comprises a plurality of SPUs and wherein the PU and the plurality of SPUs are on a same processor chip.

\* \* \* \* \*